Figure 1:
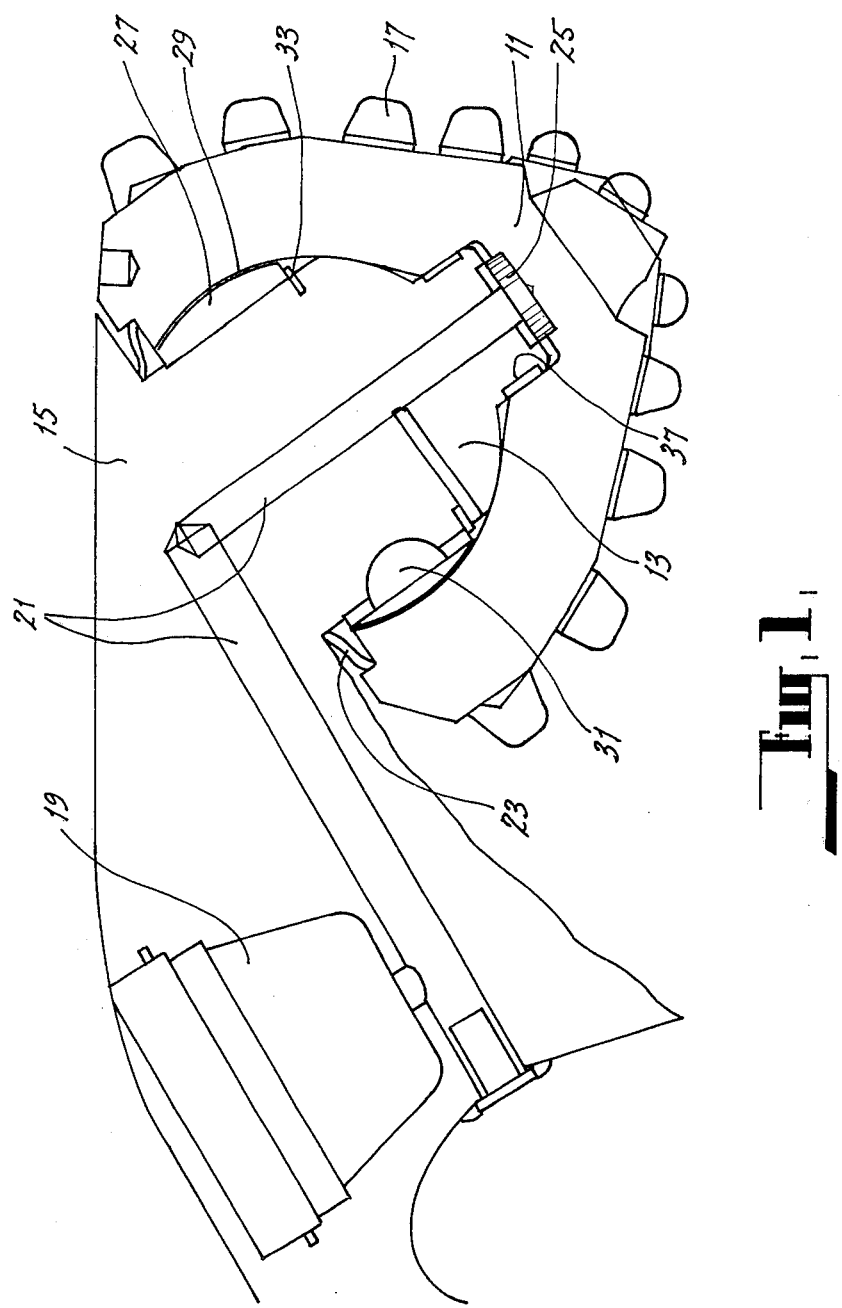

United States Patent [19]

Rear

[11] 4,010,985
[45] Mar. 8, 1977

[54] ROTARY DRILL BIT

[76] Inventor: Ian Graeme Rear, 53 Louise St., Nedlands, Western Australia, Australia, 6009

[22] Filed: Dec. 23, 1975

[21] Appl. No.: 643,939

[52] U.S. Cl. .............................................. 308/8.2
[51] Int. Cl.² ........................................ F16C 19/00
[58] Field of Search .................................... 308/8.2

[56] References Cited

UNITED STATES PATENTS

| 3,480,341 | 11/1969 | Hickernell | 308/8.2 |
| 3,620,580 | 11/1971 | Cunningham | 308/8.2 |

FOREIGN PATENTS OR APPLICATIONS

| 1,260,582 | 1/1959 | France | 308/8.2 |

Primary Examiner—Joseph F. Peters
Assistant Examiner—Gene A. Church

[57] ABSTRACT

A rotary drill bit having a bit head and roller cutters mounted thereon, wherein each roller cutter is rotatably mounted upon a shaft fixed at one end to the bit head, the shaft being provided with an annular formation having a spherical outer surface thereon, forming the bearing surface of the shaft. The roller cutter is provided with an inner bearing surface in bearing engagement with that of the shaft and of corresponding configuration.

10 Claims, 8 Drawing Figures

ROTARY DRILL BIT

This invention relates to rotary drill bits and in particular to the mounting of the roller cutters to the bit head.

During operation of a rotary drill bit the mounting of the roller cutters to the bit head must accommodate for the axial loads and the radial loads exerted upon the cutter. In order to provide for such loading it is the present practice to separate the loading areas between the roller cutter and shaft such that one bearing surface between the components will accommodate the axial loading and another will accommodate the radial loading. To provide for the dual loading in this manner has necessitated the utilisation of multiple bearings in the roller cutter mounting and the necessity of complicated machining procedures in the production of the varying bearing surfaces of both the shaft and cutter.

Another difficulty in the production of the rotary drill bits has been the retention of the roller cutters on the shaft of the bit head. The shafts generally have parallel axial faces and the retention of the roller cutter to the shaft has been effected by the introduction of a member or members between the shaft and cutter to prevent axial movement therebetween. Such members have included ball bearings introduced into a ball bearing race between the shaft and cutter through an axial channel provided in the shaft after the assembly of the cutter on the shaft. The members have also comprised a plug inserted through an oblique channel in the shaft to enter an annular space between the shaft and roller cutter and engage both members to prevent axial movement therebetween but permit rotary movement. The latter arrangement is the subject of Australian Patent, No. 280,012.

However, both of the above arrangements have the disadvantage of requiring specialised machining of the shafts and the introduction of further components to the mounting of the roller cutter to the shaft which may not be otherwise necessary. In addition with such mountings once the retention members have become worn the degree of axial and radial movement of the roller cutter on the shaft increases to cause the breakdown of the lubricant seals therebetween when fitted, and permit the escape of lubricant if present from between the two components and the entry of foreign abrasive matter into the same space to result in the drill bit rapidly deteriorating. Such movement also reduces the retention capability between the shaft and roller cutter in the event of shocks that may occur in operation and the raising and lowering of the drill bit into and out of the well.

It is an object of this invention to provide a rotary drill bit having a bearing surface between the shaft and roller cutters which will accommodate both axial and radial loadings thereon.

It is a further object of this invention to provide a rotary drill bit wherein the retention of the roller cutter to the shaft can be facilitated by the bearing members therebetween without specialised machining of the shaft and roller cutter other than that required for the bearing surfaces.

It is a further object of this invention to provide a rotary drill bit wherein wear between the bearing surfaces of the shaft and the roller cutter will not have the serious effects on the retention of the roller cutter on the shaft and the retention of the lubricant therebetween as outlined for the presently used rotary drill bits.

Accordingly the invention resides in a rotary drill bit having a bit head and roller cutters mounted thereon, wherein each roller cutter is rotatably mounted upon a shaft fixed at one end to the bit head, said shaft being provided with an annular formation having a spherical outer surface thereon forming the bearing surface of said shaft, said roller cutter being provided with an inner bearing surface in bearing engagement with that of the shaft and of corresponding configuration.

Figure 3:
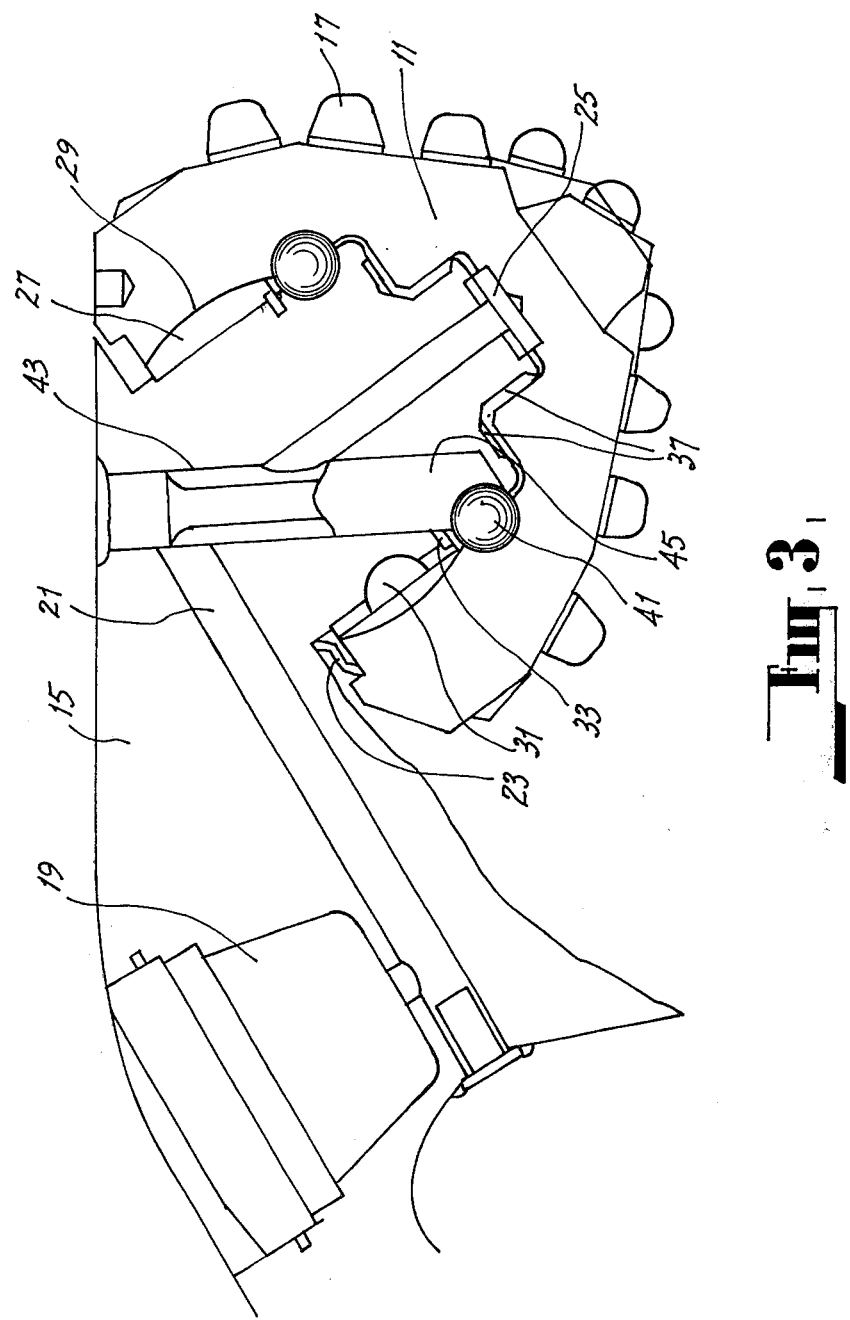
Figure 4:
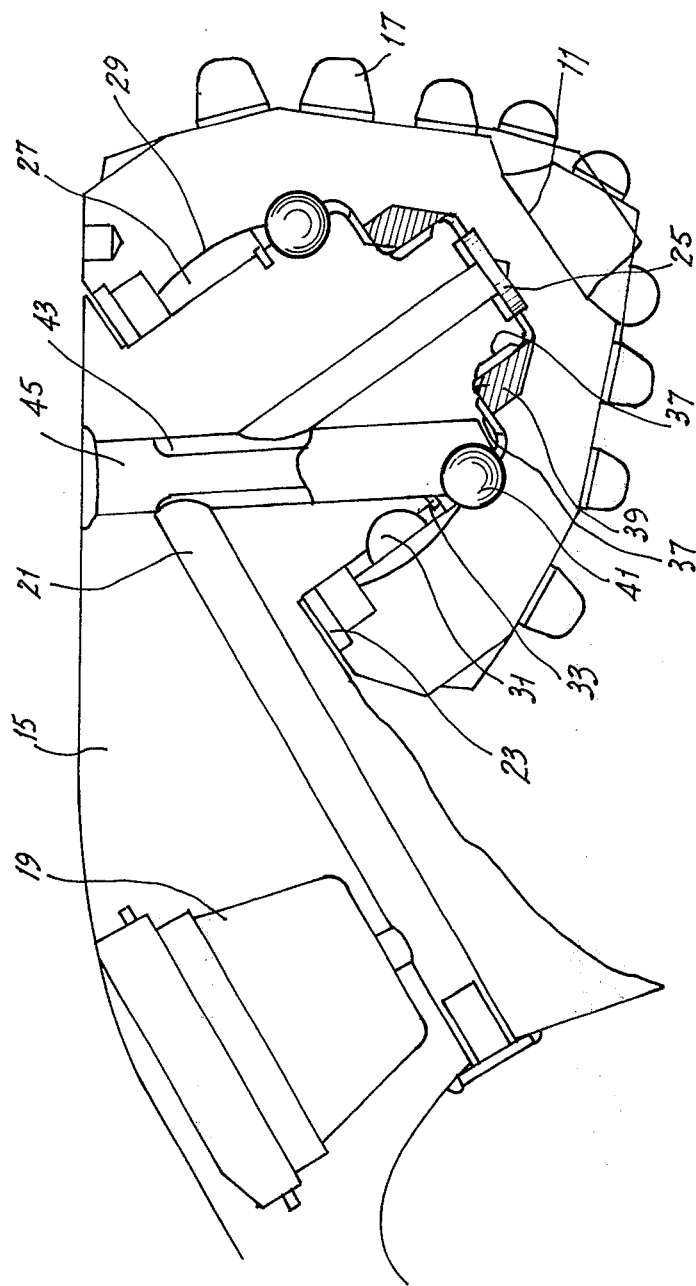
Figures 5A, 5B:
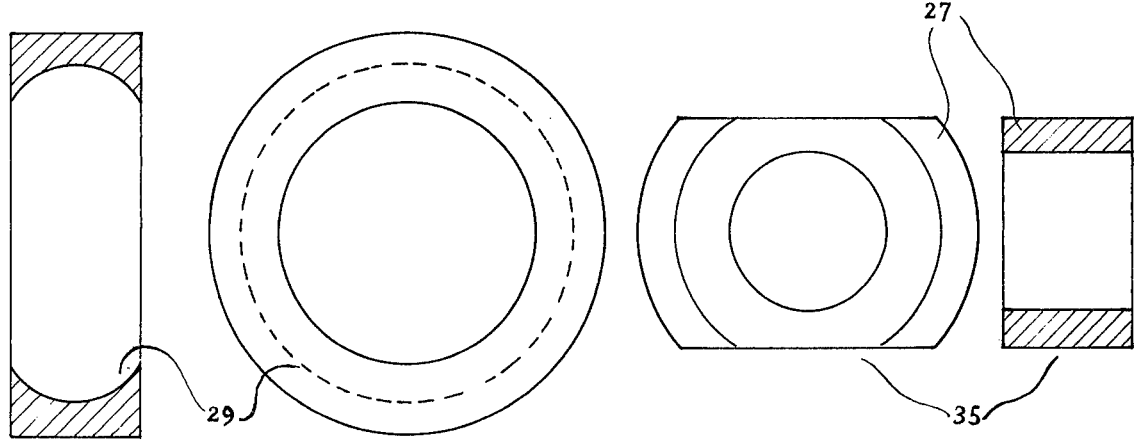

The invention will be more fully understood from the following description of several specific embodiments of the invention none of which are intended to be limiting on the scope of the invention. The description is made with reference to the accompanying drawings of which:

FIGS. 1 to 4 are four embodiments showing the mounting of a roller cutter to a rotary drill bit; and FIGS. 5A, B, C and D are various views of one form of the bearing members that may be used in association with the drill bits of FIGS. 1 to 4.

Each of the embodiments of FIGS. 1, 2, 3 and 4 comprise a roller cutter 11 rotatably mounted a shaft 13 mounted at one end to the roller cutter supports 15 of a rotary drill bit. Each of the roller cutters is provided with wear resistant elements 17, such as carbides, spaced over the surface of the roller cutter 11. In addition, the drill bit head is provided with at least one lubricant reservoir 19 which communicates via passageway 21 with the space between the roller cutter 11 and the shaft 13. In addition, a seal 23 is provided between the roller cutter 11 and shaft 13 at the inner end of the shaft to prevent the escape of the lubricant and the entry of abrasive material.

The outer end of the shaft 13 is provided with a surface of material having abrasion resisting properties which is intended to be engaged by a thrust button 25 press fitted into the corresponding end of the roller cutter 11, the thrust button being also formed of abrasion resistant material.

The bearing between the roller cutter 11 and the shaft 13 is provided through an annular collar 27 having a spherical outer surface. The collar 27 is retained on the shaft 13 and is engaged by a correspondingly shaped bearing surface 29 formed on the interior of the roller cutter. The collar 27 may be slid axially onto the shaft such that its rear edge engages a locating ridge formed at the inner end of the shaft and, by means of a woodruff key 31, be prevented from rotating upon the shaft and, by means of a circlip 33 or the like, be prevented from sliding axially upon the shaft. Alternatively, the collar 27 may be retained on the shaft by any suitable means including heat shrinking techniques.

The collar 27 on the shaft 13 is engaged by a correspondingly shaped inner surface formed in the roller cutter. The surface 29 may be integral with the roller cutter 11 and be suitably treated to be abrasion resistant. Alternatively, the surface 29 may be formed in a separate annular component which is fitted into the roller cutter by any suitable means. The latter alternative provides for the manufacture of both the collar 27 on the shaft and the component having the surface 29 formed therein from a material having abrasion resistant properties and low friction properties to ensure an extended life of the drill bit. In addition, such a procedure can reduce the machining and fine finishing such as grinding problems involved in the manufacture of the cutters.

Figures 5C, 5D:
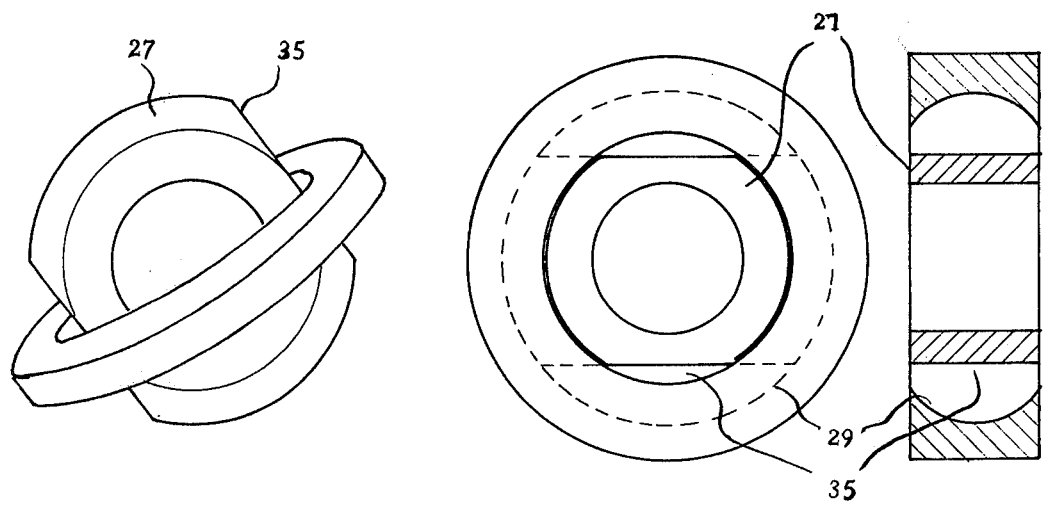

To enable the fitting of the two bearing components together whether the bearing surface 29 be formed integrally with the roller cutter or be formed on a separate element, one or the other may be formed with a pair of diametric rebates or grooves such that the component having the bearing surface 29 thereon has a transverse opening corresponding to a transverse dimension of the collar member 27. A form of such an interrelationship is shown in FIGS. 5A, B, C and D where a pair of bearing components are indicated in varying stages of assembly. The annular collar 27 is shown in end view and sectional side elevation at FIG. 5B while the component having the bearing surface 29 is shown in end view and sectional elevation at FIG. 5A. In the form shown, the annular collar 27 is provided with a pair of diametric rebates 35 such that the collar has a transverse dimension nearly equal to the diameter of the opening to the bearing surface 29. In assembling the components they are placed such that their central axes are perpendicular and the annular collar is inserted into the bearing surface component through the rebates 35 to seat on the bearing surface 29 (as shown in FIG. 5C) and then is rotated 90° about its diametric axes until both central axes are coincident (as shown in FIG. 5D). When placed together in such a manner the annular collar 27 is free to rotate within the bearing surface component but cannot be removed therefrom provided the annular collar is not in a position such that the two central axes are perpendicular.

It is also within the scope of the embodiment that the bearing surface 29 may be formed with a pair of diametric rebates such that the dimension between the rebates is at the greatest equal to the greatest diameter of the annular collar and of the same width.

In assembling a rotary drill bit having the mounting for the roller cutters as outlined, above the bearing surface 29 is formed in the roller cutter 11 or alternatively in a separate component which is fixed into the roller cutter. The annular collar 27 is then fitted in the manner described above and it in turn is fitted and fixed to the shaft 13.

Various forms of roller cutting mountings using the bearing components of FIG. 5 are shown in FIGS. 1 to 4 and are described below. The embodiment of FIG. 1 comprises a shaft 13 having the annular collar mounted thereto. The outer end of the shaft 13 is engaged in rubbing engagement with the inner end of the roller cutter 11. In addition, the outer end is provided with an annular portion 37 of hardened abrasive resistant metal to withstand some of the radial thrust exerted thereon while the thrust button 25 bears some of the axial thrust exerted on the cutter. The annular collar 27 will bear the remainder of the axial and radial thrust not borne by the thrust button 25 and the outer annular portion 37 on the shaft.

Figure 2:
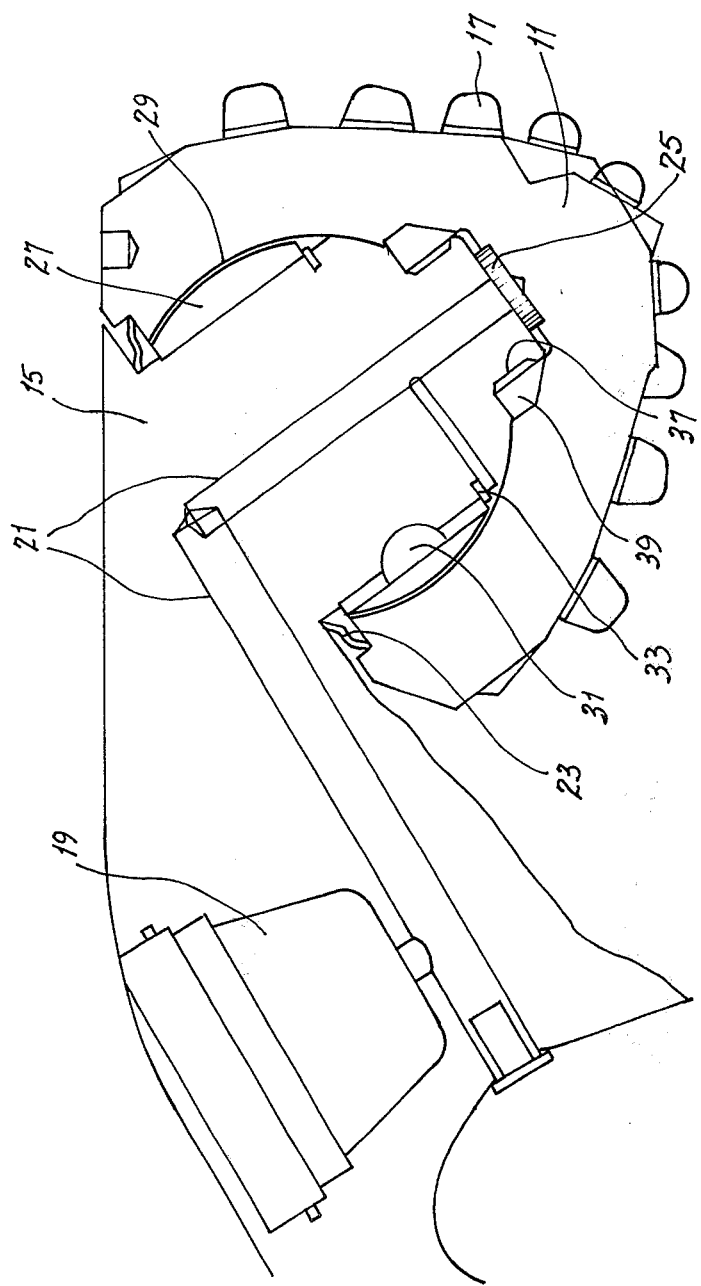

The embodiment of FIG. 2 is of the same form as that of FIG. 1 except that the inner end of the roller cutter 11 is provided with a friction bush 39 which is press fitted into the roller cutter, is formed of an abrasion resistant and low friction material and engages the annular portion 37 at the outer end of the shaft 13.

The embodiments of FIGS. 3 and 4 are of the same form as the embodiments of FIGS. 1 and 2 respectively but also include a ball bearing race 41 between the roller cutter 11 and shaft 13. The ball bearing race 41 serves in sharing the axial thrust together with the annular collar 27 and annular portions 37 at the outer end of the shaft 13 and in assisting in retaining the roller cutter 11 on the shaft 13. The ball bearings of the race 41 are introduced through the channel 43 in the shaft 13 to take their position in the race after the roller cutter has been mounted to the shaft 13. Once the race has been filled a plug 45 is inserted and welded into the channel 43 to block the return of the ball bearings. However, it will be appreciated that the incorporation of the ball bearing race 41 in the roller cutter mounting is a preferred feature only.

In practice each of the embodiments have a significant number of advantages over previous mountings and some of these advantages are outlined below:

a. The annular collar 27 serves to retain the roller cutter 11 on the shaft 13 and to increase the working life of the drill bit. During use the thrust taken by the collar 27 is not borne on its surfaces adjacent the drill bit head and shaft support 15. Therefore as there is little or no wearing of this region the roller cutter after a period of use will not be able to be moved appreciably in an axial direction toward the outer end of the shaft 13. However, wear will occur at the faces of the annular collar remote from the shaft support 15 permitting movement of the roller cutter 11 towards the support 15. In the event of any such excessive wear of the annular collar the inner end of the roller cutter will rub against the support 15 and by the incorporation of abrasion resistant material or by metallurgical heat treatment methods or the like at these points the wear thereat can be reduced. The ultimate result of such retention characteristics is that the life of the seal 23 is extended since the degree of outward axial movement of the roller cutter is eliminated. In addition the inward axial movement as a result of wear is not as detrimental to the action of the seal for it has not the action of pulling the seal from engagement with a sealing surface of the roller cutter 11 or shaft 13.

b. The annular collar 27 will take both the radial thrust and axial thrust exerted upon the roller cutter so eliminating the necessity for dual bearings and complicated machining of parts which may result in the creation of weaknesses due to variation of thickness. However to reduce the loading on the annular collar 27 the standard components such as thrust buttons and friction bushes can be provided at the outer end of the shaft to bear some of the axial and radial thrust.

c. The engagement of the annular collar 27 by the bearing surface 29 of the roller cutter provides a large bearing surface area and eliminates the point loading which exists with the use of ball and roller bearings of the prior art.

d. The manufacture of the annular collar 27 and the bearing surface 29 in the roller cutter 11 involve relatively simple machining techniques. In addition where the bearing surface 29 is formed in a separate component for mounting in the roller cutter 11 both the annular collar 27 and separate component can be formed of a high abrasion resistant and low friction material.

I claim:

1. A rotary drill bit comprising a bit head and roller cutters mounted on said head, a shaft fixed at one end to the bit head, each roller cutter being rotatably mounted on said shaft, said shaft being provided with an annular formation having a substantially spherical outer surface thereon, any one point on the surface having a center of curvature on the diametric axis of the annular formation which intersects that point, said spherical outer surface forming a bearing surface of said shaft, each said roller cutter being provided with a correspondingly formed bearing surface to surround the spherical outer surface of the annular formation and bearingly engage said surface.

2. A rotary drill bit as claimed in claim 1 wherein the correspondingly formed inner bearing surface of said roller is formed as a separate element from the roller and is mounted and locked into said roller.

3. A rotary drill bit as claimed in claim 1 wherein said annular formation is formed as a separate element from the shaft and is retained on said shaft by means of a key to prevent relative rotation therebetween and a locking member to prevent relative axial movement therebetween.

4. A rotary drill bit as claimed at claim 1 wherein the bearing surface of the roller cutters is provided with a pair of diametrically opposed grooves centered parallel to the longitudinal axis of the cutter and having a width at least equal to that of the annular formation and a depth such that the diametric dimension between the grooves is at least equal to the greatest diametric dimension of the formation, said grooves serving to accommodate the annular formation when its central axis is perpendicular to that of the cutter and permit longitudinal movement therebetween.

5. A rotary drill bit as claimed at claim 1 wherein said annular cutter has a pair of diametrically opposed flattened portions to provide a location on the annular cutter having a diametric dimension at the greatest equal to the opening in the roller cutter into the inner bearing surface, said flattened portions serving to permit entry of the annular formation into the opening when the central axis of the roller cutter is perpendicular to that of the annular formation.

6. A rotary drill bit as claimed at claim 1 comprising a ball bearing race between said roller and shaft.

7. A rotary drill bit as claimed at claim 1 comprising a roller bearing race between said roller and shaft.

8. A rotary drill bit as claimed at claim 1 comprising both a roller bearing race and a ball bearing race between said roller and shaft.

9. A rotary drill bit as claimed in claim 1 wherein the space between said roller and shaft may be connected to a supply of lubricant.

10. A rotary drill bit as claimed in claim 1 wherein the outer end of said shaft is formed as a cylindrical spigot having a surface with abrasion resisting properties and engaged in a corresponding formation in said roller having abrasion resisting properties.

* * * * *